(12) United States Patent
Strain et al.

(10) Patent No.: US 12,503,972 B2
(45) Date of Patent: Dec. 23, 2025

(54) COOLANT FILLER NECK ASSEMBLY HAVING INTEGRATED COOLANT OVERFLOW RESERVOIR

(71) Applicant: Harley-Davidson Motor Company, Inc., Milwaukee, WI (US)

(72) Inventors: Daniel Strain, Muskego, WI (US); Matt Pavlat, Greenfield, WI (US); Michael Carlin, Sussex, WI (US); Johann Voges, Wauwatosa, WI (US); Raul Tocci, Pleasant Prairie, WI (US)

(73) Assignee: Harley-Davidson Motor Company, Inc., Milwaukee, WI (US)

( * ) Notice: Subject to any disclaimer, the term of this patent is extended or adjusted under 35 U.S.C. 154(b) by 42 days.

(21) Appl. No.: 18/652,007

(22) Filed: May 1, 2024

(65) Prior Publication Data

US 2024/0280045 A1 Aug. 22, 2024

Related U.S. Application Data

(63) Continuation of application No. 17/938,698, filed on Oct. 7, 2022, now Pat. No. 12,000,323.

(51) Int. Cl.
*F01P 11/02* (2006.01)
*F01P 11/04* (2006.01)

(52) U.S. Cl.
CPC ....... *F01P 11/0276* (2013.01); *F01P 11/0209* (2013.01); *F01P 11/029* (2013.01); *F01P 11/04* (2013.01)

(58) Field of Classification Search
CPC .......................... F01P 11/0276; F01P 11/0285
See application file for complete search history.

(56) References Cited

U.S. PATENT DOCUMENTS

| 5,680,833 | A | * | 10/1997 | Smith | F01P 11/029 |
| | | | | | 165/104.32 |
| 5,722,556 | A | * | 3/1998 | Ota | B29C 45/26 |
| | | | | | 220/785 |
| 6,056,139 | A | | 5/2000 | Gericke | |
| 6,223,793 | B1 | * | 5/2001 | Donoughe | B60S 1/50 |
| | | | | | 141/331 |

(Continued)

*Primary Examiner* — Long T Tran
(74) *Attorney, Agent, or Firm* — Jordan IP Law, LLC

(57) ABSTRACT

A coolant filler neck assembly for a pressurized cooling system. The coolant filler neck includes a cylinder housing defining a non-pressurized coolant overflow reservoir; an upper cap member attached to an upper region of the cylinder housing, the upper cap member including an overflow inlet port member arranged internally in the coolant overflow reservoir and a filler pipe member in fluidic communication with the overflow inlet port member and the pressurized cooling system; a first fluid overflow tube member arranged internally in the coolant overflow reservoir to extend in a longitudinal direction though a first region of the non-pressurized coolant overflow reservoir to direct overflow liquid coolant to the non-pressurized coolant overflow reservoir; and a second fluid overflow tube member arranged internally in the coolant overflow reservoir to extend in a longitudinal direction though a second region of the non-pressurized coolant overflow reservoir to direct the overflow liquid coolant from the non-pressurized coolant overflow reservoir to the ambient environment.

20 Claims, 6 Drawing Sheets

(56) References Cited

U.S. PATENT DOCUMENTS

| | | |
|---|---|---|
| 7,188,588 B2 | 3/2007 | Hewkin |
| 7,654,410 B2 | 2/2010 | Prince et al. |
| 7,980,204 B2 | 7/2011 | Okumura et al. |
| 9,726,069 B2 | 8/2017 | Styron et al. |
| 9,856,777 B2 | 1/2018 | Camera et al. |
| 10,151,232 B2 | 12/2018 | Lindeblad |
| 10,233,822 B2 | 3/2019 | Nishiguchi et al. |
| 10,513,967 B2 | 12/2019 | Rollinger et al. |
| 10,690,041 B2 | 6/2020 | Grava et al. |
| 11,035,286 B2 | 6/2021 | Mark et al. |
| 11,143,088 B2 | 10/2021 | Dumas |
| 11,225,901 B2 | 1/2022 | Komatsu et al. |
| 11,247,144 B2 | 2/2022 | Kison et al. |
| 2002/0157621 A1* | 10/2002 | Lefrancois ............. F01P 11/029 123/41.54 |
| 2007/0175541 A1 | 8/2007 | Ray |
| 2010/0206882 A1* | 8/2010 | Wessels ................ F01P 11/029 220/562 |
| 2015/0068619 A1 | 3/2015 | Busick et al. |
| 2016/0160740 A1* | 6/2016 | Camera ................ F01P 11/029 220/501 |
| 2020/0271506 A1* | 8/2020 | Choi ....................... G01F 23/74 |
| 2020/0370460 A1* | 11/2020 | Lee ........................ B67D 7/362 |
| 2022/0136429 A1* | 5/2022 | Crouch .................... F01P 3/18 165/72 |
| 2023/0339363 A1* | 10/2023 | Mitchell ................ F01P 11/029 |

* cited by examiner

COOLANT FILLER NECK ASSEMBLY HAVING INTEGRATED COOLANT OVERFLOW RESERVOIR

CROSS-REFERENCE TO RELATED APPLICATIONS

The present application claims the benefit of priority to U.S. patent application Ser. No. 17/938,698 (filed on Oct. 7, 2022), the contents of which is hereby incorporated by reference in its complete entirety.

TECHNICAL FIELD

One or more embodiments relate generally to a coolant filler neck assembly for a vehicle, and particular, a coolant filler neck assembly having a compact structural configuration that includes an integrated coolant overflow reservoir.

BACKGROUND

There are generally two conventional types of vehicle coolant overflow systems: an overflow-type coolant overflow system and an expansion-type coolant overflow system.

In the overflow-type coolant overflow system, there is little or no air in a closed pressurized portion. Coolant expands as the system warms. Once the cap pressure in the coolant system is reached, a relief valve opens to allow some of the coolant to flow from the radiator into a non-pressurized overflow and makeup reservoir located remote from the coolant system. As the system cools, the coolant contracts, thus allowing coolant to be drawn back into the coolant system. Due to the remote location of the non-pressurized overflow and makeup reservoir an overflow tube or hose is required to fluidically connect the overflow and makeup port on the filler neck of the coolant system to the bottom of the non-pressurized overflow and makeup reservoir. The structural configuration of the overflow-type coolant overflow system results in an increase in overall size, which in turn, increases the overall weight and manufacturing costs.

In the expansion-type coolant overflow system, an expansion tank is used to holds a prescribed volume of air as part of the closed system to absorb the coolant expansion volume due to an increase in temperature. The expansion tank is also located remote from the radiator, and thus, requires fluidic connection via one or more tubes or hoses. A pressure relieving cap is used in case of boil over. Coolant does not leave the closed system except in the event of a boil over. Similarly to the overflow-type coolant overflow system, the structural configuration of the expansion-type coolant overflow system also results in an increase in overall size, which in turn, increases the overall weight and manufacturing costs.

BRIEF SUMMARY

In accordance with one or more embodiments, a coolant filler neck assembly for a vehicle that has a compact structural configuration that includes an integrated coolant overflow reservoir.

BRIEF DESCRIPTION OF THE SEVERAL VIEWS OF THE DRAWINGS

The various advantages of the embodiments of the present disclosure will become apparent to one skilled in the art by reading the following specification and appended claims, and by referencing the following drawings, in which:

DETAILED DESCRIPTION

Figure 1:
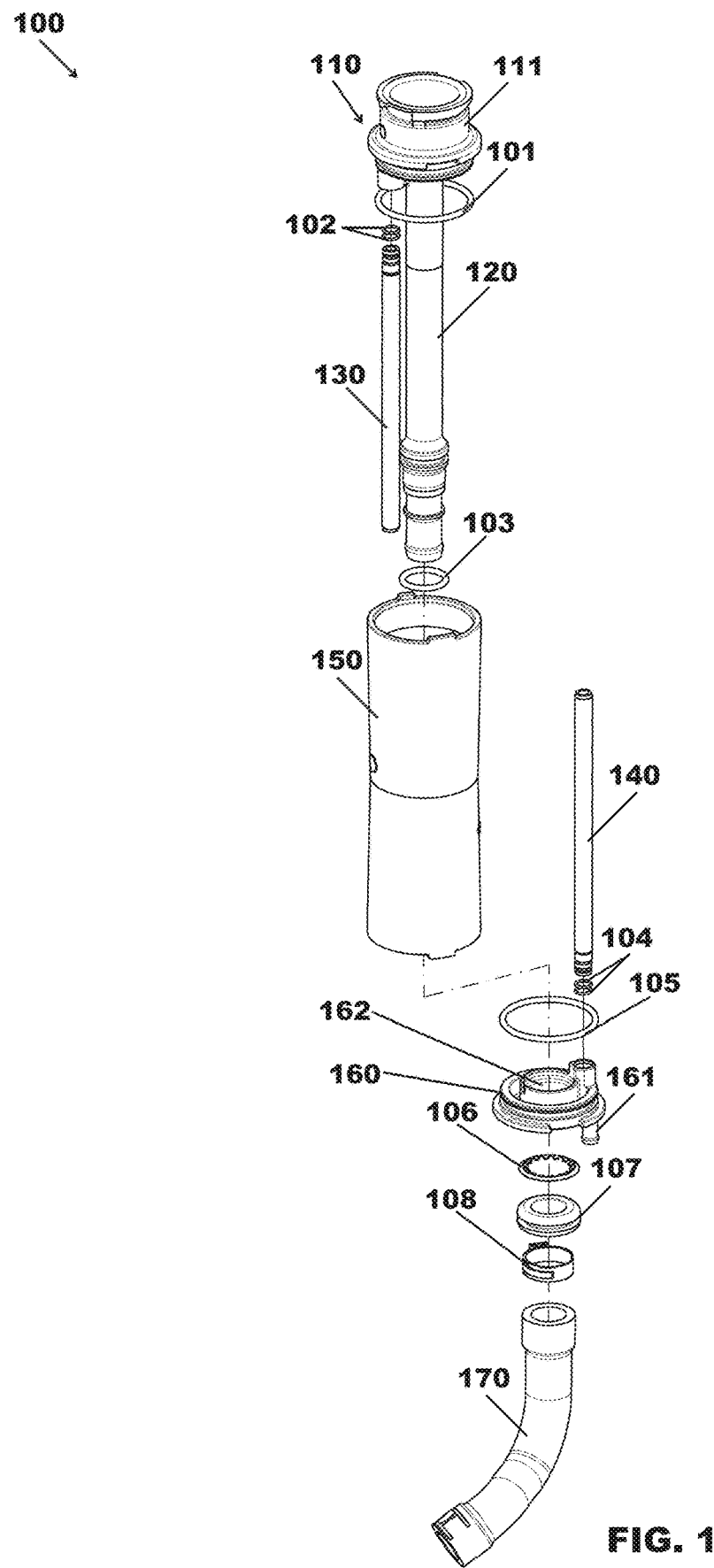
FIG. 1 illustrates an exploded view of an example coolant filler neck assembly, in accordance with one or more embodiments set forth, illustrated, and described herein.
Figure 2:
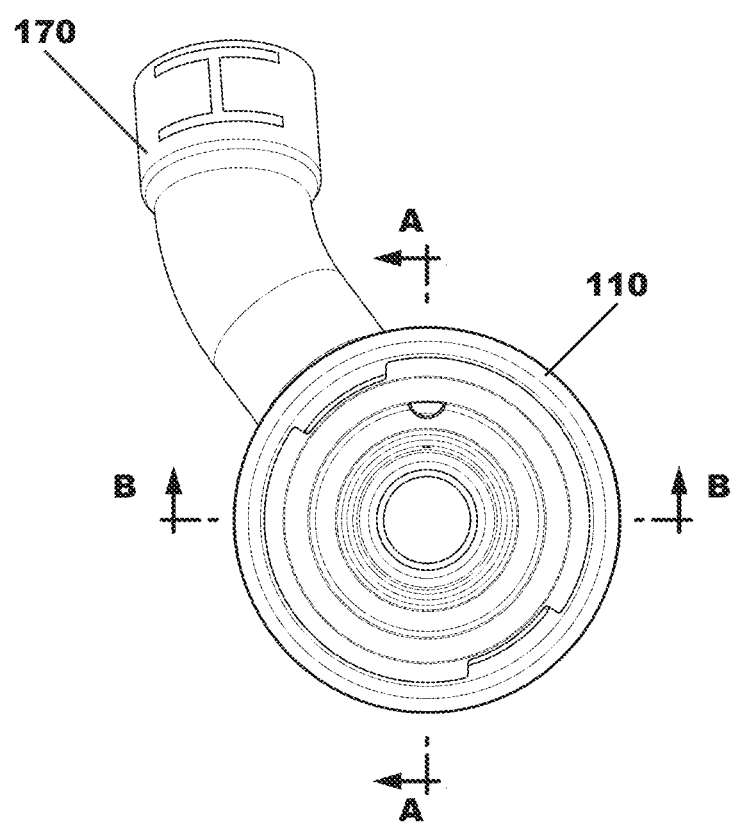
FIG. 2 illustrates a top view of an example coolant filler neck assembly, in accordance with one or more embodiments set forth, illustrated, and described herein.

Turning to the figures, in which FIG. 1 illustrates an example a coolant filler neck assembly 100 operable for fluidic connection to a pressurized cooling system of a vehicle via a coolant fill hose 170. This disclosure contemplates the vehicle comprising a two-wheeled vehicle, a three-wheeled vehicle, or any suitable vehicle that falls within the spirit and scope of the principles of this disclosure.

In accordance with one or more embodiments, the example coolant filler neck assembly 100 may not include one or more of the structural elements illustrated in FIGS. 1 through 6. The example coolant filler neck assembly 100 may have additional elements to those illustrated in FIGS. 1 through 6. The example coolant filler neck assembly 100 includes a pressurized region that is in fluidic communication with the pressurized cooling system, and a non-pressurized region that is operable to facilitate receipt and discharge/removal of overflow liquid coolant during operation due to normal expansion/contraction of the fluid in the pressurized cooling system.

Cylinder Housing

As illustrated in FIG. 1, the example coolant filler neck assembly 100 comprises a cylinder housing 150 defining the non-pressurized region that includes a coolant overflow reservoir 151 extending longitudinally therethrough. The cylinder housing 150 comprises a shell body that is composed in whole or in part of a polymer material, a composite material, a metal material, or a metal alloy material. In one example embodiment, the polymer material comprises a transparent polymer material. In another example embodiment, the polymer material comprises a semi-transparent polymer material. In a further example embodiment, the metal material comprises anodized aluminum or chrome plated steel. Embodiments, however, are not limited thereto, and thus, this disclosure contemplates the cylinder housing 150 being composed of any suitable material that falls within the spirit and scope of the principles of this disclosure.

Upper Cap Member

An exposed upper region of the cylinder housing 150 is closed via a top or upper cap member 110. The upper cap member 110 is removably attached via press fit connection to the upper region of the cylinder housing 150 for fluidic connection to a filler pipe 120. In particular, the connection between the upper region of the cylinder housing 150 and the upper cap member 110 comprises a keyed connection. The interface between the outer peripheral surface of the upper cap member 110 and the inner radial surface of the cylinder housing 150 is hermetically sealed via one or more seal members 101 such as, for example, O-rings. The upper cap member 110 and all components thereof is composed in whole or in part of a polymer material. In one example embodiment, the polymer material comprises nylon. Embodiments, however, are not limited thereto, and thus, this disclosure contemplates the upper cap member 110 being composed of any suitable material that falls within the spirit and scope of the principles of this disclosure.

Figure 3:
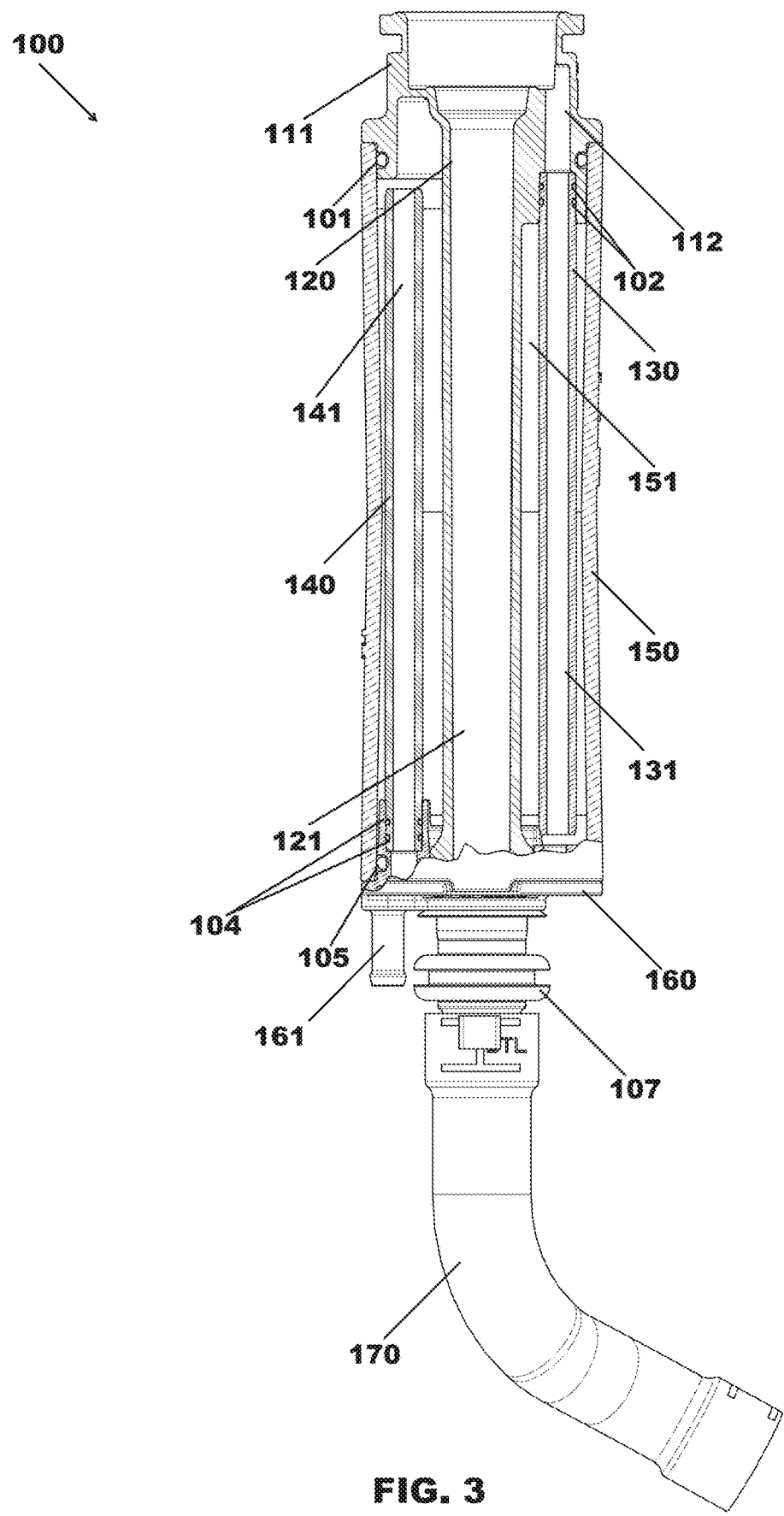
FIG. 3 illustrates a sectional view according to section A-A of FIG. 2.
Figure 4:
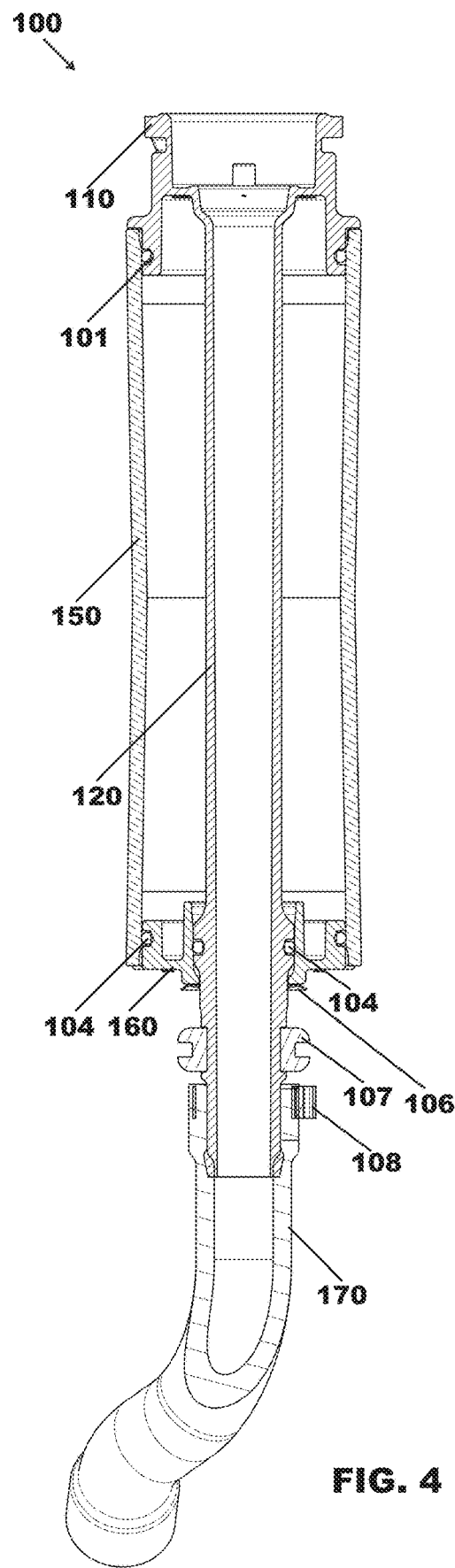
FIG. 4 illustrates a sectional view according to section B-B of FIG. 2.
Figure 5:
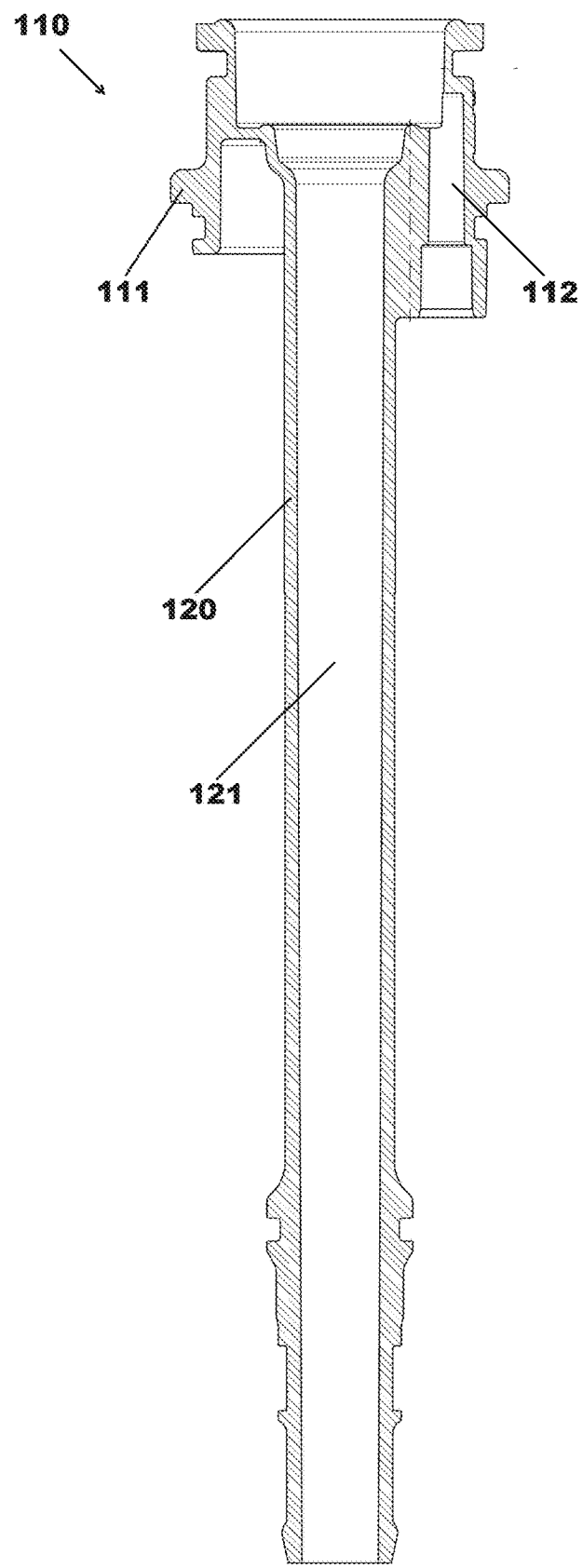
FIG. 5 illustrates a sectional view of an upper cap member and filler pipe member of an example adjustable footrest peg mount assembly, in accordance with one or more embodiments set forth, illustrated, and described herein.

An upper region of the upper cap member 110 comprises an end cap member 111 that is closed by a radiator cap member (not illustrated). In accordance with one or more embodiments, the upper cap member 110 is removably attached via an interference or press fit connection to the cylinder housing 150. As illustrated in FIG. 3, the upper cap member 110 comprises a first non-pressurized overflow fluid conduit defined by an overflow inlet port member 112 that is arranged internally in the coolant overflow reservoir 151. The overflow inlet port member 112 extends downwardly in a longitudinal direction from the end cap member 111 into the coolant overflow reservoir 151 to facilitate receipt of overflow liquid coolant during a boil over of the pressurized cooling system.

A lower region of the upper cap member 110 comprises a pressurized fluid conduit defined by a filler pipe member 120. The filler pipe member 120 is arranged in the pressurized region of the coolant filler neck assembly 100. The filler pipe member 120 extends downwardly in a longitudinal direction from the end cap member 111 through a central region of the non-pressurized coolant overflow reservoir 151 to define a pressurized fluid path through the coolant filler neck assembly 100. Although the illustrated embodiments reveal a unitary structural configuration of the end cap member 111 and the filler pipe member 120, embodiments are not limited thereto. This disclosure contemplates the upper cap member 110 having a bifurcated structural configuration in which the end cap member 111 and the filler pipe member 120 form a hermetically sealed, mechanical connection in any manner that falls within the spirit and scope of the principles of this disclosure. The filler pipe member 120 is fluidically connected a longitudinal end thereof to the pressurized coolant system via the coolant fill hose 170. The filler pipe member 120 is also in fluidic communication with the overflow inlet port member 112 to facilitate a flow of overflow liquid coolant through the overflow inlet port member 112 during expansion of the fluid in the pressurized cooling system. A clamp member 108 establishes a mechanical connection between the filler pipe member 120 and the coolant fill hose 170.

Overflow Tube Members

The non-pressurized region further includes a second non-pressurized overflow fluid conduit defined by a first fluid overflow tube member 130 and a third non-pressurized overflow fluid conduit defined by a second fluid overflow tube member 140 that are respectively arranged internally in the coolant overflow reservoir 151. The first fluid overflow tube member 130 and the second fluid overflow tube member 140 are composed in whole or in part of a metal material or a metal alloy material. In one example embodiment, the metal material comprises aluminum. Embodiments, however, are not limited thereto, and thus, this disclosure contemplates the first fluid overflow tube member 130 and the second fluid overflow tube member 140 being composed of any suitable material that falls within the spirit and scope of the principles of this disclosure.

The first fluid overflow tube member 130 extends in a longitudinal direction though a first region of the non-pressurized coolant overflow reservoir 151. The first fluid overflow tube member 130 is arranged in the non-pressurized coolant overflow reservoir 151 to ensure that only liquid coolant is drawn into the pressurized cooling system during a makeup function. The first fluid overflow tube member 130 is fluidically connected at one longitudinal end thereof to the overflow inlet port member 112 and at an opposite longitudinal end thereof to the non-pressurized coolant overflow reservoir 151. The fluidic connection between the first fluid overflow tube member 130 and the overflow inlet port member 112 is hermetically sealed via one or more seal members 102 such as, for example, O-rings. In operation, overflow liquid coolant is to flow from the overflow inlet port member 112 to the first fluid overflow tube member 130, where it is to then flow into the coolant overflow reservoir 151.

The second fluid overflow tube member 140 extends in a longitudinal direction though a second region of the non-pressurized coolant overflow reservoir 151. The second fluid overflow tube member 140 is arranged in the non-pressurized coolant overflow reservoir 151 to vent the non-pressurized coolant overflow reservoir 151 to the ambient environment/atmosphere while also facilitating a flow of liquid coolant from the coolant filler neck assembly 100 in a boil over of the pressurized cooling system 200.

Bottom/Lower Cap Members

An exposed lower region of the cylinder housing 150 is closed via a bottom or lower cap member 160. The lower cap member 160 is removably attached via an interference or press fit connection to the lower region of the cylinder housing 150. In particular, the connection between the lower region of the cylinder housing 150 and the lower cap member 160 comprises a keyed connection. The interface between the outer peripheral surface of the first fluid overflow tube member 130 and the inner radial surface of the lower cap member 160 is hermetically sealed via one or more seal members 104 such as, for example, O-rings. The lower cap member 160 has a through hole 162 through which extends at least a portion of the filler pipe member 120. The interface between the outer peripheral surface of the lower cap member 160 and the inner radial surface of the cylinder housing 150 is hermetically sealed via one or more seal members 105 such as, for example, O-rings.

The lower cap member 160 and all components thereof is composed in whole or in part of a polymer material. In one example embodiment, the polymer material comprises nylon. Embodiments, however, are not limited thereto, and thus, this disclosure contemplates the lower cap member 160 being composed of any suitable material that falls within the spirit and scope of the principles of this disclosure.

Figure 6:
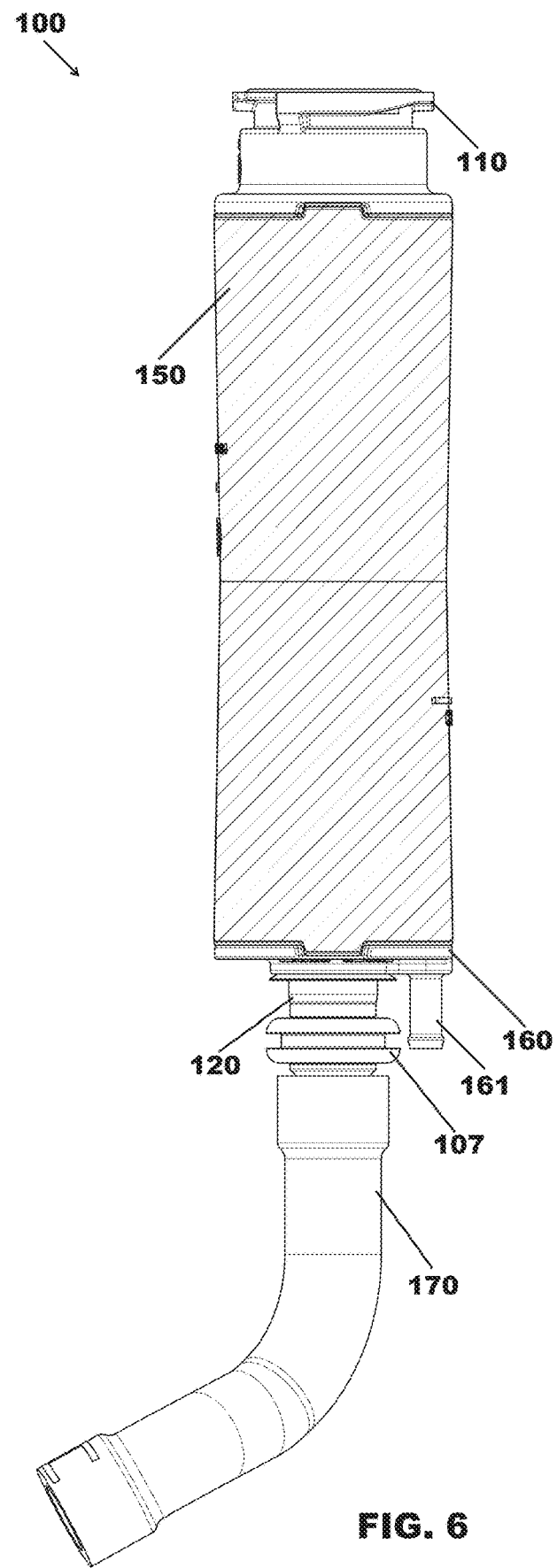
FIG. 6 illustrates a side view of an example coolant filler neck assembly, in accordance with one or more embodiments set forth, illustrated, and described herein.

As illustrated in FIGS. 1, 3, and 6, the lower cap member 160 comprises a fourth non-pressurized overflow fluid conduit defined by an overflow outlet port member 161 that is in fluidic communication with the second fluid overflow tube member 140. The fluidic connection between the second fluid overflow tube member 140 and the overflow outlet port member 161 is hermetically sealed via one or more seal members 104 such as, for example, O-rings. The overflow outlet port member 161 extends downwardly in a longitudinal direction from the lower cap member 160 to facilitate flow of overflow liquid coolant externally from the coolant filler neck assembly 100 to the ambient environment/atmosphere in in a boil over of the pressurized cooling system 200.

A push nut or retaining ring member 106 is concentrically arranged on the filler pipe member 120 to maintain the connection between the filler pipe member 120 (and thus, the upper cap member 110) and the lower cap member 160. In the illustrated embodiment, the retaining ring 106 comprises a base washer body having a plurality of radial fingers extending in a radially inward direction from a circumferential inner edge of the base washer body. The retaining ring 106 is composed in whole or in part of a metal material or a metal alloy material. Embodiments, however, are not limited thereto, and thus, this disclosure contemplates the retaining ring 106 being composed of any suitable material that falls within the spirit and scope of the principles of this disclosure.

A vibration-damping grommet member 107 is concentrically arranged on the filler pipe member 120 to isolate vibrations that may occur by the example coolant filler neck assembly 100 during operation of the vehicle. The vibration-damping grommet member 107 is composed in whole or in part of a polymer material such as, for example, rubber. Embodiments, however, are not limited thereto, and thus, this disclosure contemplates the vibration-damping grommet member 107 being composed of any suitable material that falls within the spirit and scope of the principles of this disclosure.

Examples

The disclosure further includes additional notes and examples, as set forth in the following clauses.

Clause 1A. A coolant filler neck assembly for a pressurized cooling system, the coolant filler neck comprising: a cylinder housing defining a non-pressurized coolant overflow reservoir; an upper cap member attached to an upper region of the cylinder housing, the upper cap member including an overflow inlet port member arranged internally in the coolant overflow reservoir and a filler pipe member in fluidic communication with the overflow inlet port member and the pressurized cooling system; a first fluid overflow tube member arranged internally in the coolant overflow reservoir to extend in a longitudinal direction though a first region of the non-pressurized coolant overflow reservoir to direct overflow liquid coolant to the non-pressurized coolant overflow reservoir; and a second fluid overflow tube member arranged internally in the coolant overflow reservoir to extend in a longitudinal direction though a second region of the non-pressurized coolant overflow reservoir to direct the overflow liquid coolant from the non-pressurized coolant overflow reservoir to the ambient environment.

Clause 2A. The coolant filler neck assembly of Clause 1A, wherein the first fluid overflow tube member extends in a longitudinal direction though a first region of the non-pressurized coolant overflow reservoir.

Clause 3A. The coolant filler neck assembly of Clause 2A, wherein a first longitudinal end of the first fluid overflow tube member is in fluidic communication with the overflow inlet port member and a second, opposite longitudinal end of the first fluid overflow tube member is in fluidic communication with the non-pressurized coolant overflow reservoir.

Clause 4A. The coolant filler neck of Clause 1A, further comprising a lower cap member attached to an upper region of the cylinder housing.

Clause 5A. The coolant filler neck assembly of Clause 4A, wherein lower cap member comprises an overflow outlet port member in fluidic communication with the second fluid overflow tube member to direct the overflow liquid coolant from the second fluid overflow tube member to the ambient environment.

Clause 6A. The coolant filler neck assembly of Clause 5A, wherein a first longitudinal end of the second fluid overflow tube member is in fluidic communication with the overflow outlet port member and a second, opposite longitudinal end of the second fluid overflow tube member is in fluidic communication with the non-pressurized coolant overflow reservoir.

Clause 7A. The coolant filler neck assembly of Clause 6A, further comprising one or more first seal members operable to form a hermetical seal at an interface between the second fluid overflow tube member and the overflow outlet port member.

Clause 8A. The coolant filler neck assembly of Clause 5A, further comprising one or more second seal members operable to form a hermetical seal at an interface between the lower cap member and the cylinder housing.

Clause 9A. The coolant filler neck assembly of Clause 1A, further comprising one or more third seal members operable to hermetically seal the upper cap member and the cylinder housing.

Clause 10A. The coolant filler neck assembly of Clause 1A, further comprising one or more fourth seal members operable to form a hermetical seal at an interface between the first fluid overflow tube member and the overflow inlet port member.

Clause 1B. A coolant filler neck assembly for a pressurized cooling system, the coolant filler neck comprising: a cylinder housing defining a non-pressurized coolant overflow reservoir; an upper cap member enclosing an upper region of the cylinder housing, the upper cap member including a pressurized fluid conduit arranged internally in the non-pressurized coolant overflow reservoir and in fluidic communication with the pressurized cooling system, and a first non-pressurized fluid conduit arranged internally in the non-pressurized coolant overflow reservoir and in fluidic communication with the pressurized fluid conduit; a second non-pressurized fluid conduit arranged internally in the non-pressurized coolant overflow reservoir and in fluidic communication with the first non-pressurized fluid conduit to direct overflow liquid coolant to the non-pressurized coolant overflow reservoir; and a third non-pressurized fluid conduit arranged internally in the non-pressurized coolant overflow reservoir and in fluidic communication with the non-pressurized coolant overflow reservoir to direct the overflow liquid coolant to the ambient environment.

Clause 2B. The coolant filler neck assembly of Clause 1B, wherein the second non-pressurized fluid conduit extends in a longitudinal direction though a first region of the non-pressurized coolant overflow reservoir.

Clause 3B. The coolant filler neck assembly of Clause 2B, wherein a first longitudinal end of the second non-pressurized fluid conduit is in fluidic communication with the first non-pressurized fluid conduit and a second, opposite longitudinal end of the second non-pressurized fluid conduit is in fluidic communication with the non-pressurized coolant overflow reservoir.

Clause 4B. The coolant filler neck of Clause 1B, further comprising a fourth non-pressurized fluid conduit in fluidic communication with the third non-pressurized fluid conduit to direct the overflow liquid coolant from the third non-pressurized fluid conduit to the ambient environment.

Clause 5B. The coolant filler neck assembly of Clause 4B, wherein a first longitudinal end of the third non-pressurized fluid conduit is in fluidic communication with the fourth non-pressurized fluid conduit and a second, opposite longitudinal end of the third non-pressurized fluid conduit is in fluidic communication with the non-pressurized coolant overflow reservoir.

Clause 1C. A coolant filler neck assembly for a pressurized cooling system, the coolant filler neck comprising: a cylinder housing defining a non-pressurized coolant overflow reservoir; and a plurality of fluid conduits arranged internally in the non-pressurized coolant overflow reservoir, the plurality of fluid conduits including: a pressurized fluid conduit in fluidic communication with the pressurized cooling system, a first non-pressurized fluid conduit in fluidic communication with the pressurized fluid conduit, a second non-pressurized fluid conduit in fluidic communication with the first non-pressurized fluid conduit to direct overflow liquid coolant to the non-pressurized coolant overflow reservoir, and a third non-pressurized fluid conduit in fluidic communication with the non-pressurized coolant overflow reservoir to direct the overflow liquid coolant to the ambient environment.

Clause 2C. The coolant filler neck assembly of Clause 1C, wherein the second non-pressurized fluid conduit extends in a longitudinal direction though a first region of the non-pressurized coolant overflow reservoir.

Clause 3C. The coolant filler neck assembly of Clause 2C, wherein a first longitudinal end of the second non-pressurized fluid conduit is in fluidic communication with the first non-pressurized fluid conduit and a second, opposite longitudinal end of the second non-pressurized fluid conduit is in fluidic communication with the non-pressurized coolant overflow reservoir.

Clause 4C. The coolant filler neck of Clause 1C, further comprising a fourth non-pressurized fluid conduit in fluidic communication with the third non-pressurized fluid conduit to direct the overflow liquid coolant from the third non-pressurized fluid conduit to the ambient environment.

Clause 5C. The coolant filler neck assembly of Clause 4C, wherein a first longitudinal end of the third non-pressurized fluid conduit is in fluidic communication with the fourth non-pressurized fluid conduit and a second, opposite longitudinal end of the third non-pressurized fluid conduit is in fluidic communication with the non-pressurized coolant overflow reservoir.

Clause 1D. A coolant filler neck assembly for a pressurized cooling system, the coolant filler neck comprising: a cylinder housing defining a non-pressurized coolant overflow reservoir; and a plurality of fluid conduits arranged internally in the non-pressurized coolant overflow reservoir, the plurality of fluid conduits including: a pressurized fluid conduit in fluidic communication with the pressurized cooling system, a first non-pressurized fluid conduit in fluidic communication with the pressurized fluid conduit, a second non-pressurized fluid conduit in fluidic communication with the first non-pressurized fluid conduit to direct overflow liquid coolant to the non-pressurized coolant overflow reservoir, a third non-pressurized fluid conduit in fluidic communication with the non-pressurized coolant overflow reservoir to direct the overflow liquid coolant to the ambient environment, and a fourth non-pressurized fluid conduit in fluidic communication with the third non-pressurized fluid conduit to direct the overflow liquid coolant from the third non-pressurized fluid conduit to the ambient environment.

Clause 2D. The coolant filler neck assembly of Clause 1D, wherein the second non-pressurized fluid conduit extends in a longitudinal direction though a first region of the non-pressurized coolant overflow reservoir.

Clause 3D. The coolant filler neck assembly of Clause 2D, wherein a first longitudinal end of the second non-pressurized fluid conduit is in fluidic communication with the first non-pressurized fluid conduit and a second, opposite longitudinal end of the second non-pressurized fluid conduit is in fluidic communication with the non-pressurized coolant overflow reservoir.

Clause 4D. The coolant filler neck of Clause 1D, wherein a first longitudinal end of the third non-pressurized fluid conduit is in fluidic communication with the fourth non-pressurized fluid conduit and a second, opposite longitudinal end of the third non-pressurized fluid conduit is in fluidic communication with the non-pressurized coolant overflow reservoir.

Clause 1E. A coolant filler neck assembly for a pressurized cooling system, the coolant filler neck comprising: a non-pressurized coolant overflow reservoir; and a plurality of fluid conduits arranged internally in the non-pressurized coolant overflow reservoir, the plurality of fluid conduits including: a pressurized fluid conduit in fluidic communication with the pressurized cooling system, a first non-pressurized fluid conduit in fluidic communication with the pressurized fluid conduit, a second non-pressurized fluid conduit in fluidic communication with the first non-pressurized fluid conduit to direct overflow liquid coolant to the non-pressurized coolant overflow reservoir, and a third non-pressurized fluid conduit in fluidic communication with the non-pressurized coolant overflow reservoir to direct the overflow liquid coolant to the ambient environment.

Clause 2E. The coolant filler neck assembly of Clause 1E, wherein the second non-pressurized fluid conduit extends in a longitudinal direction though a first region of the non-pressurized coolant overflow reservoir.

Clause 3E. The coolant filler neck assembly of Clause 2E, wherein a first longitudinal end of the second non-pressurized fluid conduit is in fluidic communication with the first non-pressurized fluid conduit and a second, opposite longitudinal end of the second non-pressurized fluid conduit is in fluidic communication with the non-pressurized coolant overflow reservoir.

Clause 4E. The coolant filler neck of Clause 1E, further comprising a fourth non-pressurized fluid conduit in fluidic communication with the third non-pressurized fluid conduit to direct the overflow liquid coolant from the third non-pressurized fluid conduit to the ambient environment.

Clause 5E. The coolant filler neck assembly of Clause 4E, wherein a first longitudinal end of the third non-pressurized fluid conduit is in fluidic communication with the fourth non-pressurized fluid conduit and a second, opposite longitudinal end of the third non-pressurized fluid conduit is in fluidic communication with the non-pressurized coolant overflow reservoir.

Clause 1F. A coolant filler neck assembly for a pressurized cooling system, the coolant filler neck comprising: a non-pressurized coolant overflow reservoir; and a plurality of fluid conduits arranged internally in the non-pressurized coolant overflow reservoir, the plurality of fluid conduits including: a pressurized fluid conduit in fluidic communication with the pressurized cooling system, a first non-pressurized fluid conduit in fluidic communication with the pressurized fluid conduit, a second non-pressurized fluid conduit in fluidic communication with the first non-pressurized fluid conduit to direct overflow liquid coolant to the non-pressurized coolant overflow reservoir, a third non-pressurized fluid conduit in fluidic communication with the non-pressurized coolant overflow reservoir to direct the overflow liquid coolant to the ambient environment, and a fourth non-pressurized fluid conduit in fluidic communication with the third non-pressurized fluid conduit to direct the overflow liquid coolant from the third non-pressurized fluid conduit to the ambient environment.

Clause 2F. The coolant filler neck assembly of Clause 1F, wherein the second non-pressurized fluid conduit extends in a longitudinal direction though a first region of the non-pressurized coolant overflow reservoir.

Clause 3F. The coolant filler neck assembly of Clause 2F, wherein a first longitudinal end of the second non-pressurized fluid conduit is in fluidic communication with the first non-pressurized fluid conduit and a second, opposite longitudinal end of the second non-pressurized fluid conduit is in fluidic communication with the non-pressurized coolant overflow reservoir.

Clause 4F. The coolant filler neck of Clause 1F, wherein a first longitudinal end of the third non-pressurized fluid conduit is in fluidic communication with the fourth non-pressurized fluid conduit and a second, opposite longitudinal end of the third non-pressurized fluid conduit is in fluidic communication with the non-pressurized coolant overflow reservoir.

The terms "coupled," "attached," or "connected" may be used herein to refer to any type of relationship, direct or indirect, between the components in question, and may apply to electrical, mechanical, fluid, optical, electromagnetic, electro-mechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the embodiments of the present disclosure may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A coolant filler neck assembly comprising:
   a cylinder housing defining a coolant overflow reservoir; and
   a plurality of fluid conduits arranged internally in the coolant overflow reservoir, the plurality of fluid conduits including:
      a filler fluid conduit for fluidic communication with a cooling system,
      a first fluid conduit for fluidic communication with the filler fluid conduit,
      a second fluid conduit for fluidic communication with the first fluid conduit to direct overflow coolant to the coolant overflow reservoir,
      a third fluid conduit for fluidic communication with the coolant overflow reservoir to direct the overflow coolant to an ambient environment, and
      a fourth fluid conduit for fluidic communication with the third fluid conduit to direct overflow coolant from the third fluid conduit to the ambient environment.

2. The coolant filler neck assembly of claim 1, further comprising a first cap member for receipt at an upper region of the cylinder housing.

3. The coolant filler neck assembly of claim 2, wherein the first cap member comprises the first fluid conduit.

4. The coolant filler neck assembly of claim 2, wherein the first cap member comprises the filler fluid conduit.

5. The coolant filler neck assembly of claim 1, further comprising a second cap member for receipt at a lower region of the cylinder housing.

6. The coolant filler neck assembly of claim 5, wherein the second cap member comprises the fourth fluid conduit.

7. A coolant filler neck assembly, comprising:
   a cylinder housing defining a coolant overflow reservoir; and
   a plurality of fluid conduits arranged internally in the coolant overflow reservoir, the plurality of fluid conduits including:
      a filler fluid conduit for fluidic communication with a cooling system,
      a first fluid conduit for fluidic communication with the filler fluid conduit,
      a second fluid conduit for fluidic communication with the first fluid conduit to direct overflow coolant to the coolant overflow reservoir, and
      a third fluid conduit for fluidic communication with the coolant overflow reservoir to direct the overflow coolant to an ambient environment.

8. The coolant filler neck assembly of claim 7, wherein the second fluid conduit extends in a longitudinal direction though a first region of the coolant overflow reservoir.

9. The coolant filler neck assembly of claim 8, wherein a first longitudinal end of the second fluid conduit is in fluidic communication with the first fluid conduit.

10. The coolant filler neck assembly of claim 9, wherein a second, opposite longitudinal end of the second fluid conduit is in fluidic communication with the coolant overflow reservoir.

11. The coolant filler neck assembly of claim 7, further comprising a first cap member for receipt at an upper region of the cylinder housing.

12. The coolant filler neck assembly of claim 11, wherein the first cap member comprises the first fluid conduit.

13. The coolant filler neck assembly of claim 11, wherein the first cap member comprises the filler fluid conduit.

14. The coolant filler neck assembly of claim 7, further comprising a second cap member for receipt at a lower region of the cylinder housing.

15. A vehicle, comprising:
   a coolant filler neck assembly including:

a cylinder housing defining a coolant overflow reservoir; and a plurality of fluid conduits arranged internally in the coolant overflow reservoir, the plurality of fluid conduits including a filler fluid conduit for fluidic communication with a cooling system, a first fluid conduit for fluidic communication with the filler fluid conduit, a second fluid conduit for fluidic communication with the first fluid conduit to direct overflow coolant to the coolant overflow reservoir, a third fluid conduit for fluidic communication with the coolant overflow reservoir to direct the overflow coolant to an ambient environment, and a fourth fluid conduit for fluidic communication with the third fluid conduit to direct overflow coolant from the third fluid conduit to the ambient environment.

16. The vehicle of claim 15, further comprising a first cap member for receipt at an upper region of the cylinder housing.

17. The vehicle of claim 16, wherein the first cap member comprises the first fluid conduit.

18. The vehicle of claim 16, wherein the first cap member comprises the filler fluid conduit.

19. The vehicle of claim 15, further comprising a second cap member for receipt at a lower region of the cylinder housing.

20. The vehicle of claim 19, wherein the second cap member comprises the fourth fluid conduit.

* * * * *